L. W. LOMBARD.
COMBINED SHOCK ABSORBER AND AIR PUMP FOR AUTOMOBILES.
APPLICATION FILED JULY 23, 1914.
1,151,805. Patented Aug. 31, 1915.
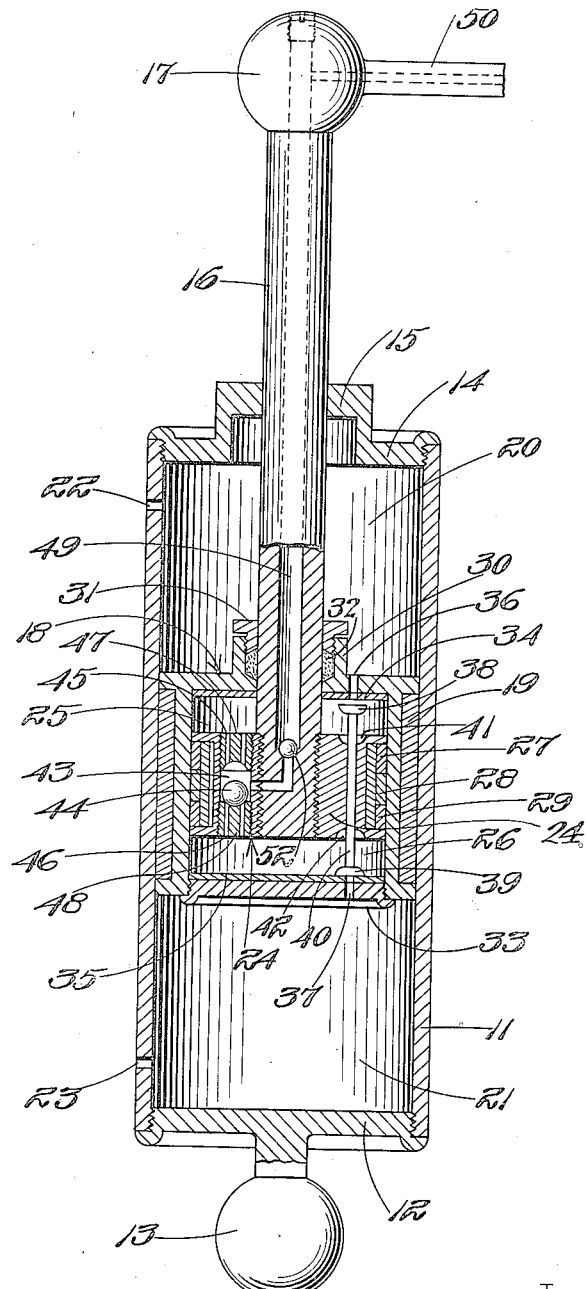
WITNESSES:
John H. Parker
Helen N. Purcell
INVENTOR:
Levi W. Lombard
by Macleod, Calver, Copeland & Dike
Attys.

UNITED STATES PATENT OFFICE.

LEVI W. LOMBARD, OF WALTHAM, MASSACHUSETTS, ASSIGNOR TO FEDERAL ENGINEERING COMPANY, OF NEWTON, MASSACHUSETTS, A CORPORATION OF MASSACHUSETTS.

COMBINED SHOCK-ABSORBER AND AIR-PUMP FOR AUTOMOBILES.

1,151,805.  Specification of Letters Patent.  Patented Aug. 31, 1915.

Application filed July 23, 1914. Serial No. 852,702.

*To all whom it may concern:*

Be it known that I, LEVI W. LOMBARD, citizen of the United States, residing at Waltham, county of Middlesex, State of Massachusetts, have invented a certain new and useful Improvement in Combined Shock-Absorbers and Air-Pumps for Automobiles, of which the following is a specification, reference being had therein to the accompanying drawings.

My invention has for its object to provide a shock absorber for automobiles which shall have the effect of taking up the shocks due to unevenness in the road surface and preventing their transmission to the body of the automobile and at the same time shall operate as an air pump to supply air under pressure to a tank for use in operating a compressed air self starter for filling pneumatic tires and for such other purposes as may be required. While other attempts have been made to provide combined shock absorbers and air pumps difficulty has been experienced in producing a device which will furnish a supply of air at high pressure at times when the car is traveling over a relatively smooth road which produced oscillations of narrow amplitude between the running gear and the frame.

The device embodying my invention is so constructed that even very small oscillations will pump air at a high pressure and the efficiency of the device as a shock absorber is increased rather than diminished.

While I have described and shown only a single form of my device in the accompanying drawings, I do not limit myself to this construction since I am fully aware that it is capable of embodiment in a variety of forms.

For the purpose of illustrating the breadth of the invention, it may be said that an essential feature is the employment of a hollow piston or cylinder which coöperates as a piston with another exterior cylinder, and also coöperates as a cylinder with an interior piston, thereby forming two combinations of piston and cylinder, so that, suitable valves being provided, one combination acts as an air pump and the other as a shock absorber.

Another equally important feature of my invention is the arrangement so that the first part of the oscillation between the running gear and frame operates the air-pump combination while the further or succeeding travel operates the shock absorber combination.

The device embodying my invention is extremely simple and all the working parts are inclosed within the main cylinder so that the possibility of injury or loss of adjustment is reduced to a minimum. The device may also be installed in place of one of the two or four shock absorbers ordinarily employed.

The invention will be fully understood from the following description taken in connection with the accompanying drawings, and the novel features thereof will be pointed out and clearly defined in the claims at the close of the specification.

Referring to the drawings,—the figure is a vertical section of the device embodying my invention in its preferred form.

At 11 is shown, the body or main cylinder closed at the lower end by a cap 12 provided with a ball 13 for connection with a bracket, not shown, on the lower spring or axle or running gear of the car. The upper end is closed by a cap 14 having thereon a hollow boss 15 and having a proper aperture to allow the piston rod 16 to slide therein. The piston rod 16 is provided at its upper end with the ball 17 which is secured to a bracket, not shown, on the body or frame of the car. Within the cylinder 11 is located a main piston or auxiliary cylinder 18 provided with a stiff spring packing ring 19 which exerts considerable pressure on the walls of the cylinder and prevents the passage of air past the piston. The spring ring 19 also engages the wall of the cylinder so strongly as to require a considerable force to be exerted to move it vertically in the cylinder. The main piston 18 divides the interior of the cylinder 11 into two chambers 20 and 21 respectively which are vented to the atmosphere by ports 22 and 23, located at a short distance from the ends of the cylinder, so that when the piston passes one of these ports an air cushion will be formed in the end of the cylinder. The main piston 18 is hollow and contains within it an auxiliary piston 24 which divides the interior into two chambers 25 and 26. Spring packing rings 27, 28 and 29 are provided to insure a tight fit between the walls of the bore of this chamber and the piston.

The auxiliary piston 24 is secured to the lower end of the piston rod 16 by screw threads or the like and the piston rod passes out through a stuffing box 30 provided with a nut 31 and suitable packing 32. The lower end of the chamber contained within the main piston is closed by a cap 33 and the ends of the chamber are cushioned by thin layers of elastic material designated 34 and 35. At 36 and 37 are shown two ports leading from the upper chamber 20 into the upper auxiliary chamber 25 and from the lower chamber 21 to the lower auxiliary chamber 26. These two ports are controlled by two valves 38 and 39, both of which are carried on a stem 40 which slides in a suitable hole in the auxiliary piston 24. Small hollows 41 and 42 are formed in the upper and lower faces of the auxiliary piston so that the auxiliary piston may move the entire length of the auxiliary chamber without doing injury to the valves.

At 43 is shown a valve chamber containing a ball 44 or other suitable valve member. The valve chamber 43 is connected with the upper auxiliary chamber 25 by one or more ports 45 and with the lower auxiliary chamber 26 by two other ports 46.

The valve chamber 43 is conveniently constructed by drilling a hole through the piston and closing the hole by two screw threaded plugs 47 and 48, the ports 45, 46 being drilled through the respective plugs. The valve chamber 43 communicates with an air passage 49 formed partly in the auxiliary piston 24 and partly in the piston rod 16. This passage also extends into a hose connection 50 by which the compressed air produced by the action of the device is carried away into the tank or other storage space.

At 52 is shown a valve which prevents the flow of air back into the valve chamber. The operation of my device is as follows,—The movement of the car over the surface of the roadway produces oscillations between the frame and the axles which move the piston rod 16 relatively to the main cylinder 11, and it has been found by careful study that even on the smoothest roads and at slow speed oscillations of an inch or more result almost continuously. Assuming for convenience, that the first oscillatory movement tends to bring the axle nearer to the frame of the car thereby moving the cylinder upward or the piston downward, as shown in the drawing, it will be seen that the auxiliary piston will move downward compressing the air in the lower auxiliary chamber 26 and that the ball valve 44 will fly upward and close the ports 45 so that the air contained in the lower auxiliary chamber 26 will then escape through the ports 46 and the air passage 49 past the valve 52. The downward movement of the auxiliary piston will contine until it strikes the elastic cushion 35 or until the pressure of the air in the lower auxiliary chamber becomes so great that the friction between the main piston and the wall of the main cylinder are overcome. Up to this point the device has operated solely as a pump. The operation as the shock absorber now begins. The main piston then moves downwardly in the lower main chamber 21 compressing the air therein which escapes through the vent 23. This movement continues until the position of equilibrium is reached. The downward movement of the auxiliary piston while the main piston remains stationary causes air to be drawn in through the port 36 from the upper main chamber 20 into the upper auxiliary chamber 25.

When the reverse movement begins the first movement of the piston rod 16 causes the valve 38 to seat thereby opening the port 37 so that from then on the lower auxiliary chamber is filled with air ready for the next downward stroke. Movement of the auxiliary piston upwardly compresses the air in the upper auxiliary chamber and the ball valve 44 closes the ports 46 into the lower auxiliary chamber so that the air in the upper auxiliary chamber is free to flow through into the passage 49 leading to the air tank.

From the foregoing it will be seen that even the smallest movements of a car such as are produced on smooth roads will cause the device to pump air under high pressure and at the same time the cushioning effect of the device is increased rather than diminished because the auxiliary piston moves for a short distance before the main piston begins to move, thereby easing the action of the device.

While I have described the action of my device as if the main piston remains stationary until the completion of the pumping stroke, it is possible that relative movements between the two pistons may occur while both pistons are moving. This, however, does not affect the portion of the device which depends on a movement of the auxiliary piston relatively to that of the main piston, it being immaterial whether this takes place while the main piston is stationary or while it is moving.

I claim—

1. In a combined shock absorber and air pump, a main cylinder, a hollow piston forming an auxiliary cylinder, a piston in said auxiliary cylinder, said hollow piston or auxiliary cylinder being provided with ports leading into the main cylinder, valves controlling said ports, other ports in the piston in said auxiliary cylinder and valves controlling them, said elements forming two combinations of piston and cylinder one of said combinations acting as a shock absorber and the other as an air pump.

2. The combined shock absorber and air pump comprising a cylinder, a piston within the cylinder, said piston having a cylindrical chamber therein, an auxiliary piston in said chamber, said cylinder and said auxiliary piston being secured one to the frame and the other to the running gear, and suitable valves whereby the movement of the frame and running gear relatively to each other first operate the auxiliary piston as a pump and then the main piston as a shock absorber.

3. In the combined shock absorber and air pump, a main cylinder closed at its ends, an auxiliary hollow cylinder contained within said main cylinder and fitting the bore thereof inclosed at its ends, a piston within the auxiliary cylinder and fitting the bore thereof, said parts being provided with suitable ports, valves controlling said ports, said elements forming two combinations of piston and cylinder, one acting as a shock absorber and the other as an air pump.

4. The combined shock absorber and air pump comprising a cylinder, a piston therein, said piston having a cylindrical chamber therein, an auxiliary piston, said cylinder and said piston rod being secured one to the frame and the other to the running gear, there being a passage leading through the piston rod into the chamber within the main piston, and passages leading through the ends of the main piston into the main cylinder, and valves controlling the said passages whereby the movement of the frame and the running gear relatively to each other first operate the auxiliary piston as a pump then the main piston as a shock absorber.

In testimony whereof I affix my signature, in presence of two witnesses.

LEVI W. LOMBARD.

Witnesses:
 EDWIN M. BROOKS,
 GEORGE P. DIKE.